Oct. 3, 1950   J. W. SAWYER   2,524,737
MOLD FOR CASTING NEGATIVE SURFACE REPLICAS
Original Filed March 2, 1949

INVENTOR
JOHN W. SAWYER
BY *A. H. Helmstun*
ATTORNEY

Patented Oct. 3, 1950

2,524,737

UNITED STATES PATENT OFFICE 2,524,737

MOLD FOR CASTING NEGATIVE SURFACE REPLICAS

John W. Sawyer, Arlington, Va.

Original application March 2, 1949, Serial No. 79,264. Divided and this application October 24, 1949, Serial No. 123,282

6 Claims. (Cl. 18—34)

(Granted under the act of March 3, 1883, as amended April 30, 1928; 370 O. G. 757)

This invention relates generally to the art of testing and measuring surface defects of machine elements by the use of cast negative plastic replicas thereof, and more specifically to improvements in mold structures for casting the negative surface replicas. This application is a division of Serial Number 79,264, filed March 2, 1949, for Method and Apparatus for Testing Surface Defects.

The parent application discloses novel testing means for gears, bearings, boiler tubes and the like wherein the defects evidenced by surface structures are disclosed, reproduced in a settable plastic and removed from the ship or power plant where the element is located and studied or measured in a remote laboratory. The plastic is cast in place on the element in the vicinity of a defect, to produce a minutely exact negative surface replica. For this purpose a liquid plastic of low viscosity is employed to assure accuracy of the replica, and to effect full detail therein as to the most minute of surface irregularities. The plastic is normally cast in a mold of some type adapted to retain the liquid plastic on the surface to be examined or tested until the hardening of the plastic is completed. Chemical hardening means of various types may be employed as known in the art and as described in the parent application.

In the casting of surface images or replicas especially of large power transferring gears, some applications of the technique of the parent application require placing a mold on the lower face or a substantially upright face of a gear wheel, bearing, shaft or the like. The mold must therefore be of special form and structure. A great variety of such forms would be required to fit all types of elements to be tested. This invention provides means for molding replicas of a great variety of surfaces with a limited number of mold forms, and further provides means for causing the mold lips to conform to curved or irregular surfaces, and for retaining the mold in place while it is filled and the plastic is hardening therein.

An object of the present invention is to provide method and means for reproducing the surface characteristics of machine elements in permanent form for study and analysis.

Another object is to provide means for obtaining cast negative replicas of gear surfaces and other surfaces of curved or intricate nature.

Still another object is to provide suitable forms and molds for making negative surface replicas.

Other objects and features of the invention will become apparent to those skilled in the art as the disclosure is made in the following detailed description of a preferred embodiment of the invention as illustrated in the accompanying sheet of drawings in which.

Figure 1:
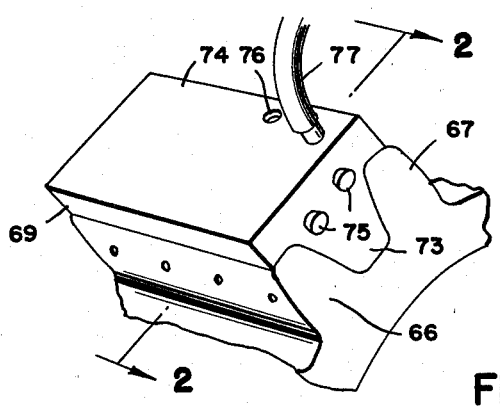
Fig. 1 is a side elevation of a gear tooth mold for casting a negative replica of a gear section.
Figure 2:
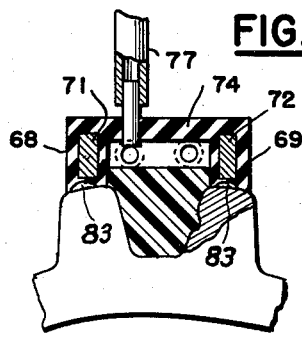
Fig. 2 is a sectional view through 2—2 of Fig. 1.

In Figs. 1 and 2 is shown a form of mold suitable for use on gears or other structures of magnetic material where only a portion of the surface is to be reproduced for test. The space between teeth 66 and 67, for a portion of the length of the teeth, may be enclosed as illustrated. Lateral walls 68 and 69 are formed preferably of a resilient material such as rubber, being sufficiently flexible to conform to the curvature of the surface, such as the outer faces of a helical gear. Within walls 68 and 69 are holes of suitable size to receive and retain hold-on magnets 71 and 72 which may be distributed at intervals within the walls 68 and 69, sufficiently close to maintain contact between the flexible walls and the curved face of teeth 66 and 67. End walls as at 73 are cemented to the side walls, or formed integrally therewith and have a shape to conform roughly to the space to be filled or dammed. A mold top 74 is cemented to the walls or formed integrally therewith. Holes through the top and at least one end provide access for filling, holes not used being plugged as at 75. During filling a vent hole 76 is left at the uppermost edge of the cavity and the filling tube or applicator 77 inserted in another hole at the same upper edge for completely filling the mold.

By use of the magnetic hold-on method, sponge rubber dams and walls may be used, so as to avoid the necessity of exact cutting and fitting of the mold structure to the surface contours. Thus the mold may be quickly made and inserted, though the fit is not good, and the magnets hold the contact between mold and surface sufficiently to permit casting a surface replica.

Figure 5:
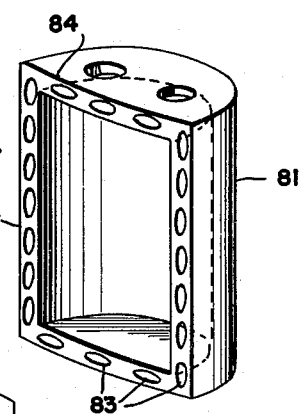
Fig. 5 is a front perspective view of the mold of Fig. 3 in the scale of Fig. 4.
Figure 3:
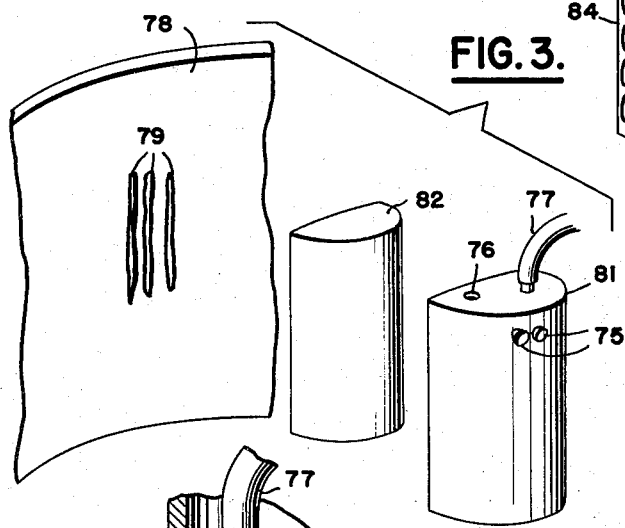
Fig. 3 is an exploded perspective view of an internal cylindrical surface, a mold therefor and the molded negative replica of the surface.
Figure 4:
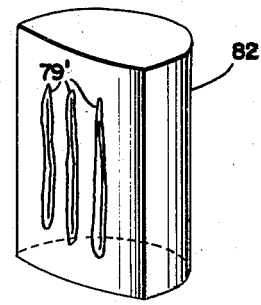
Fig. 4 is a front perspective view, somewhat enlarged, of the molded surface of Fig. 3.
Figure 6:
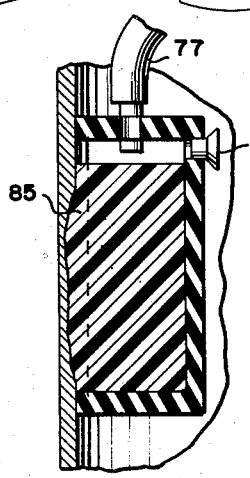
Fig. 6 is a vertical sectional view of the filled mold, attached to the surface of Fig. 3.

Fig. 3 illustrates an internal cylindrical surface and the formation of a cast thereon. The surface 78 may be a bearing, boiler tube or the like, having defects 79 due to strain, burning or pitting. The mold 81 and casting 82 are shown more clearly in Figs. 5 and 4, rotated to show surface and hold-on means. The reproduced surface structure is shown at 79'. The mold is held in place during casting by the suction cups 83 arranged in the surface-adhering edges 84 of the mold 81. The mold is made of rubber-like material sufficiently flexible to conform to the surface and to permit forcing of some of the air from the suction cups 83 by local pressure thereon. When the mold has been firmly pressed against the surface 78, as illustrated in Fig. 6 it remains in position because of the suction cup arrangement and may be filled from the uppermost holes through a tube or applicator 77. When the plastic material 85 has hardened the mold and cast are readily removed as illustrated in Fig. 3, preserving the cast negative replica of the surface detail.

After securing a cast replica such as 82, the replica may be inspected and tested in the same manner as the gear, bearing, or other surface would be tested if available in the laboratory. For example, a brush analyzer may be employed to test the surface in the laboratory, the surface may be examined by microscope or the structure thereon may be measured accurately by means of a standard profilometer or profilograph. The hardened plastic material may also be subjected to a number of tests in succession without loss of detail due to wear or breakage. The absence of grain structure permits measurements not possible with ordinary cast images.

Standards of surface texture and smoothness comparison blanks have been successfully reproduced by this method to serve as secondary standards with accuracy to a few millionths of an inch. The permanence and grainlessness of the casts and the perfection of the detail exhibited permit laboratory examination of surface detail of machine elements without disassembling or moving the machine, thereby increasing the frequency and precision of testing and inspection, and by use of a chronological series of replicas from the same defect progressive deterioration may be measured and the growth of defects recorded for study.

Obviously many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed is:

1. A mold for casting negative replicas of a curved surface comprising a pair of end walls formed of an elastomer, an arcuate central portion formed of said elastomer contiguously with said end walls, thereby forming a hollow portion co-operating with said surface for retention of a casting liquid, said end walls and central portion having the exposed edge portions thereof shaped to conform to said surface, cupped depressions formed in and distributed along the exposed faces of the edge portions, being constructed and arranged for retaining a partial vacuum as the exposed edge portions are forced against said surface, part of the air in said cupped depressions being thereby exhausted, whereby the mold may be temporarily secured to the surface, and means in said walls for filling the mold with said liquid plastic.

2. A mold for casting negative replicas of a portion of a surface of magnetic material comprising a flexible-walled cavity mold having an open side arranged contiguously with said portion of surface, the cavity mold edges being cut to conform approximately to the contours of said surface portion, filling holes in the walls of the mold for exhausting the air from the cavity and inserting a liquid plastic therein, magnetized elements arranged within said flexible walls adjacent to said cut edges and distributed therealong, whereby the mold is held firmly to said surface when pressed thereagainst.

3. A mold for casting negative replicas of a curved surface comprising, end and side wall portions of flexible material joined to form an open sided cavity having wall edges constructed and arranged for contact with a selected portion of said surface when placed thereagainst under pressure, means for filling said cavity with a liquid molding material, and surface attracting means within said wall portions at the edges thereof for adhering to the surface, whereby pressure to maintain said edge contact is maintained.

4. A mold for gear tooth surfaces comprising; a mold cavity having end wall members adapted to close the space between adjacent gear teeth at the ends thereof, an outer wall member connecting opposite said end wall members to form an outer wall of said mold, lateral wall members sealed to and extending along the sides of said outer wall member, said lateral members each having a tooth engaging face adapted to contact the full length of a gear tooth, said wall members being constructed of resilient material to conform to a variety of gear shapes and spacings; and a plurality of magnetized elements distributed along said tooth engaging faces of the lateral wall members for holding said faces in close contact with said gear teeth, when manually adjusted to liquid sealing relation therewith.

5. A mold for gear tooth surfaces comprising, a pair of end wall members disposed at the ends of said gear teeth and of resilient material adapted to fill the intertooth space at the sides of the gear for at least the distance between adjacent teeth of the gear, a resilient mold member connecting said pair of end wall members and forming a back wall for the mold, a pair of side wall members of resilient material each joined at the ends thereof to said pair of end wall members and at one side thereof to said connecting mold member, thereby forming a mold cavity when the other sides of said side wall members engage, respectively, the outer edges of a pair of gear teeth, and means within said other sides of the wall members including suction members actuated by compression of the wall members, for retaining the mold in cooperative cavity-forming relation with said teeth edges during a casting operation.

6. The mold of claim 5 having magnetic elements within the side walls thereof for increasing the retaining force holding said mold to said gear teeth edges.

JOHN W. SAWYER.

No references cited.